United States Patent [19]

McClean et al.

[11] 4,145,740

[45] Mar. 20, 1979

[54] FILAMENT WINDING APPARATUS

[75] Inventors: William G. McClean, Milwaukee; Daniel C. Budge, Menomonee Falls, both of Wis.

[73] Assignee: Tri-N Associates, Inc., Milwaukee, Wis.

[21] Appl. No.: 760,937

[22] Filed: Jan. 21, 1977

[51] Int. Cl.$^2$ .................. G06F 15/46; B65H 81/00
[52] U.S. Cl. ................................ 364/469; 156/175; 156/361; 156/425; 242/7.21; 242/DIG. 1
[58] Field of Search ............. 235/151.1; 242/7.21, 242/7.23, DIG. 1; 156/173, 172, 175, 361, 425; 318/162, 571; 364/469

[56] References Cited

U.S. PATENT DOCUMENTS

| | | | |
|---|---|---|---|
| 2,927,258 | 3/1960 | Lippel | 242/DIG. 1 |
| 2,964,252 | 12/1960 | Rosenberg | 242/DIG. 1 |
| 3,476,327 | 11/1969 | Vawter | 242/7.21 |
| 4,021,650 | 5/1977 | Ruble | 235/151.11 |

*Primary Examiner*—Jerry Smith
*Attorney, Agent, or Firm*—Andrus, Sceales, Starke & Sawall

[57] ABSTRACT

A filament winding machine includes a servomotor connected to position a filament distributing carriage relative to a rotating mandrel to form a tubular member. An incremental encoder is connected to the mandrel and produces a pulse related output per mandrel revolution. An absolute encoder is connected to the servomotor and provides an absolute position number. The encoders are sampled at a fixed rate. A mathematical calculating circuit reads the incremental encoder and based on a predetermined movement design for the gear drive, the desired winding configuration and the like determines the proper position, which is compared to the absolute encoder reading to produce an error control signal to the servomotor. A preselected sequence of actual position numbers and the corresponding calculated position numbers are continuously updated in a temporary memory. The difference of succeeding pairs provides data for directly computing the rate at which the head is moving and a proper position and thus also the data for computing actual acceleration or deceleration of the head movement. A microprocessor has proper programs with appropriate user specified parameters to produce various winding configurations. The microprocessor provides the calculation of the proper position and determination of the drive signal. Suitable optional control tables such as a cosine table may modify the calculated carriage position to produce any desired motion. Rapid and continuous monitoring permits the system to anticipate necessary correction and thereby provide a continuous and low power level correction of heavy driven elements such as a filament winding head and carriage.

16 Claims, 4 Drawing Figures

FILAMENT WINDING APPARATUS

BACKGROUND OF INVENTION

This invention relates to a programmed filament winding apparatus and particularly to such an apparatus wherein a microprocessor includes an internal program for controlling the movement of the filament winding head relative to the rotation of the winding mandrel.

Fiber reinforced plastic articles may be fabricated conventionally by winding of a strand or filament of a reinforcing material coated with a suitable resin about a mandrel in a generally helical pattern. The winding angle and pattern is conveniently controlled by varying of the speed of travel of the head carriage and/or the speed of rotation of the mandrel. In addition to simple tubular members, the final article may be formed with special end contours such as generally spherical head portions. A highly satisfactory winding system and apparatus, for example, is shown and disclosed in U.S. Pat. No. 3,499,616 which issued Mar. 10, 1970 disclosing a unique drive mechanism employing a single drive motor. Alternatively, various systems have been devised employing separate motors for driving the mandrel and the feed head carriage. To produce a satisfactory filament wound container, particularly of relatively large size, accurate positioning and movement of the filament head with the appropriate rotation of the mandrel is required. Control systems have been suggested including tape control systems such as shown in U.S. Pat. No. 3,448,253 wherein a special encoding system is employed to minimize the tape volume required. In that system a mandrel encoder unit generates pulses which are employed to drive a control tape which in turn drives the winding head. A register system is employed to store the encoded signal and to actuate the tape drive. in all systems, the apparatus should, of course, provide a high degree of accuracy, and system repeatability. Although satisfactory winding machines are available, there is a need for a reliable controlled movement having means to monitor the relative positioning of the components and to correct any errors in a rapid and reliable apparatus. The control must be able to accurately and rapidly position the filaments relative to the rotating mandrel in the presence of relatively large inertial forces within the machine. The control should also provide for winding of different sizes and types without complex changes in the apparatus.

SUMMARY OF THE PRESENT INVENTION

The present invention is particularly directed to a filament winding apparatus employing a microprocessor with a software program in memory for calculating the desired movement and position of the filament head along one or more axes with respect to the rotation of the mandrel. Generally in accordance with this invention means, an encoder means is coupled to the mandrel and for each axis, an absolute encoder is coupled to the corresponding filament positioning means. The incremental encoder produces a signal which forms a basis for calculating the optimum filament positioning means location for winding a particular tubular member. The microprocessor is connected to essentially continuously monitor the output of the mandrel encoder and the absolute encoder, and automatically compute the desired position of the filament positioning means, compare the absolute encoder which provides an actual position signal with the calculated desired position and then actuate the drive to maintain precise positioning of the filament positioning means. A microprocessor employing a program to execute a position calculation permits essential instantaneous and accurate on-line computation of the desired position of the feed head with respect to the movement of the mandrel, whether the position of the feed head be determined empirically or mathematically, to provide repeatable controlled movement of the filament position means and/or the mandrel in a predictable and accurately controlled manner.

More particularly, in a preferred and unique embodiment of the present invention, the complete basis sequential movement of a filament carriage is programmed and placed in a microprocessor memory. The necessary variables for various sizes and the like may be introduced into a temporary memory for execution. An incremental encoder is appropriately coupled to the mandrel drive motor to provide a pulse output, with a predetermined and accurate number of pulses generated for each revolution of the mandrel. The absolute encoder is coupled to a servometer which is energized to reciprocally and oppositely position the carriage and filament winding head relative to the mandrel. The processing control unit of the microprocessor reads the number of total pulses generated by the incremental encoder, and through calculation based on the gear drive systems and the like, determines the proper filament carriage position. The microprocessor reads the actual output of the absolute encoder to determine the actual carriage position.

In a preferred embodiment, the carriage position is controlled by the servomotor. The microprocessor simultaneously samples the output of the incremental encoder and the absolute encoder at predetermined time intervals of the absolute encoder per sample. The signal is then modified to increase or decrease the motor speed and acceleration in accordance with actual and desired conditions. Thus, movement of the carriage is defined in terms of the incremental encoder movement which can be defined in a logical mathematical expression. Any particular article may include a plurality of differently defined sequences. The microprocessor is provided with a descriptor table for each particular program. The memory also includes a linkage table which permits combining of the several identified winding discriptor tables. The user, through a conventional computer programming instrument, converses with the computer to define the variables for any given sequence; such as pipe winding length, angle of the filament, band width of the filament, dwell and the like. The discriptor and linkage table is also assigned an identification or selection code and the computer has an input which permits the user to directly select such program. The winding programs can provide for exceedingly large variation in the configuration and particulars for any given configuration of the filament wound article. For example, in a simple tubular member, the carriage may be driven at a relatively constant speed, with the desired positions calculated by a simple multiplication of the incremental encoder signal multiplied by a constant gear ratio. In more complex winding such as closed vessels and the like, the filament speed may require a generally continuous change in the speed at the beginning and end of each winding pass. The special movement may be developed using special tables. For example, the speed may be defined using a sine-cosine function for acceleration and deceleration. In accordance with an aspect of this invention, the characteristic definition would provide an address for a sine-cosine table from which the appropriate modifying number would be obtained for computing the proper position. The particular program being executed in a sequence is controlled by monitoring the incremental encoder and jumping from one program sequence to another at a given defined position of the head. Thus, the incremental encoder again defines the basic movement control. The movement of the mandrel and incremental encoder may also be coupled into an open loop system with the movement controlled by the microprocessor.

Generally, in accordance with a further aspect of this invention, a preselected sequence of actual position numbers and the corresponding calculated position numbers are continuously updated in a temporary memory such as the RAM memory. The difference of succeeding pairs provided data for directly computing the rate at which the head is moving and a proper position and thus also the data for computing actual acceleration or a deceleration of the head movement. Thus, from differences existing between the actual carriage position and the calculated carriage position and the differences previously existing, the microprocessor calculates an error signal which energizes the servomotor to speed up or slow down the carriage movement to its proper position. The microprocessor, through the use of control tables, may, of course, modify the calculated carriage position to produce any desired motion. This permits the microprocessor to change the driving signal to the servomotor to produce a desired speed and acceleration along the path of movement of the head. The rapid and continuous monitoring permits the system to anticipate necessary correction and thereby provide a continuous and low power level correction of the controlled apparatus. This system is therefore uniquely adapted to the control of relatively large driven elements such as a filament winding head and carriage where the size requires a continuous small correction to minimize the loading of the driving and controlling apparatus.

The combination of encoders and programmed positioning of the carriage in response to a position signal from one member results in a sensitive and accurate positioning of the filament winding carriage means to produce the desired accuracy for formation of fiber reinforced plastic members, and the like.

BRIEF DESCRIPTION OF DRAWINGS

The drawings furnished herewith illustrate preferred constructions of the present invention.

In the drawing.

DESCRIPTION OF THE ILLUSTRATED EMBODIMENT

Figure 1:
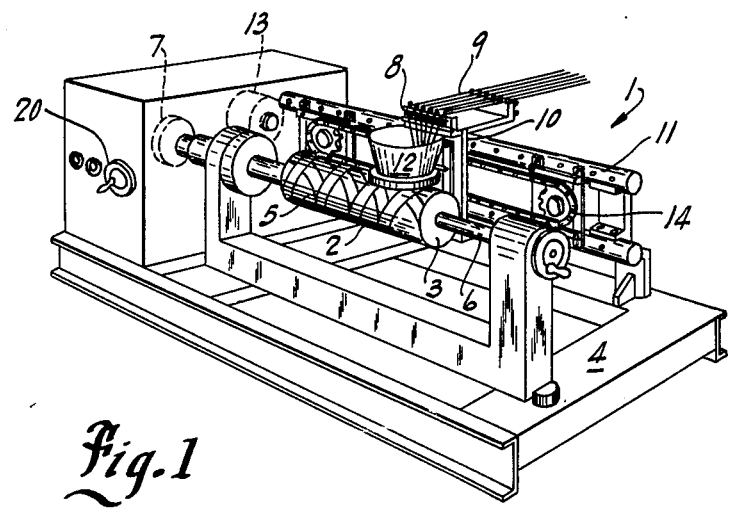
FIG. 1 is a perspective view of a filament winding machine incorporating a pair of individual drives of the mandrel and the head carriage.

Referring to the drawings and particularly to FIG. 1, a filament winding machine 1 is illustrated for fabrication of a fiber reinforced plastic article 2 such as a tubular vessel having a semi-spherical end 3. Generally, the filament winding machine 1 includes a frame or base 4 in which a form or mandrel 5 is rotatably mounted by opposite end shafts 6, one of which is secured and driven from a mandrel drive motor 7. In the illustrated embodiment of the invention, the mandrel 5 is adapted to be rotated at a constant speed and the motor 7 is coupled through a suitable drive to provide the desired rotational speed to the mandrel. A winding head 8 is provided for guiding of a resin coated fiber or filament 9 onto the rotating mandrel 5. The winding head 8 is of any suitable construction and is diagrammatically illustrated attached to a carriage 10, which is supported for reciprocating movement on a supporting slide or track 11 extending parallel to the rotational axis of the mandrel 5. The winding head 8 may be constructed to feed a plurality of filaments or a single filament 9 might be used and passed downwardly through a resin applicator 12. A plurality of incoming filaments 9 are conventionally gathered to form a band or tape of a particular band witdh within the applicator 12 with the coating of resin applied before the gathered filaments are wound onto the mandrel 5. The carriage 10 is moveably supported on slide 11 in any desired manner such as shown, for example, in U.S. Pat. No. 3,518,889. A suitable reversible servomotor 13 is provided and coupled by a suitable drive belt 14 to reversibly drive and position the carriage 10 with respect to the mandrel 5. Thus, in the illustrated embodiment a pulley is coupled to the carriage drive shaft 15 and is coupled by belt 14 to a pulley 16 on the servomotor shaft. The servomotor 13 is energized to reversibly drive the pulley system and thereby cause the carriage 10 to move back and forth across the mandrel 5 for winding of the filament 9 thereon.

In accordance with the teaching of the present invention, and particularly the preferred embodiment, an incremental encoder 17 is coupled to the mandrel 5 and is driven in synchronism therewith to generate a digital signal in the form of a train of pulse signals directly related to the mandrel rotation. An absolute encoder 18 is coupled to the carriage servomotor and is positioned to provide a precise encoded digital signal related to the axially displaced position of the carriage 10 from the reference or starting position relative to the mandrel movement at any given instance.

More particularly, the incremental encoder 17 may be of a suitable variety which will provide a digital output signal. The output is a time spaced series of pulse signals directly related to the rotation of the mandrel. The absolute encoder 18 is preferably constructed to provide a digital output signal which is directly related to the axial position of the carriage 10 and is preferably constructed to in accordance with the teaching of the co-pending application of W. George Anderson, et al, entitled Absolute Encoding Apparatus having Ser. No. 760,938 filed on Jan. 21, 1977 and assigned to the same assignee.

Generally, in accordance with this invention, the output of the incremental encoder 17 provides a position signal which through a logical mathematical definition determines the proper location of the carriage 10. Generally, the position signal is employed in a suitable calculating device operable to rapidly compute the proper location from the positional signal based on the appropriate computational formula, and then compare this computed location with the actual location as given by the absolute encoder 18. The comparison generates a related signal for energizing of the servomotor 13 to accelerate, decelerate or remain constant in accordance with the actual displacement error. Thus, the formulation of mathematical definition of the winding sequence may be provided by those skilled in the art of filament winding of tubular elements of various shapes based upon the desired specification. These may, of course, be developed empirically or mathematically and no further detailed description thereof is given. In order to provide for the winding of various types which are, of course, based on different mathematical models and different sizes of each type, the present invention includes a microprocessor 19 having a memory unit for storing the multiplicity of programs and data necessary to define and control the position of carriage 10 for each readout of the mandrel encoder 17. The absolute encoder 18 is also continuously monitored and the actual position compared with the desired location as calculated by the microprocessor 19 for any given instant. The microprocessor 19 then generates the necessary signal voltage to the reversible servomotor 13 causing the motor to appropriately accelerate or decelerate to compensate for any displacement of the carriage from the programmed position and thereby provide for the desired predictable and controlled movement. The particular winding configuration of a plurality of available configurations may be selected by the user through a machine mounted control, such as a selection knob 20 which is rotatable to anyone of a plurality of program numbers.

The microprocessor 19 is, of course, a well known computer device and is diagrammatically illustrated including the basic components and coupled through an appropriate interface system 21 to the incremental encoder 17, the absolute encoder 18 and the servomotor 13 to completely control the operation of the filament winding apparatus in accordance with an operator selection. Thus, the microprocessor 19 includes the appropriate clock 22 gating a program counter 23 for introducing an instruction address in an address registor 24. The addressed instruction stored in the corresponding address of a memory unit 25 of the microprocessor the first instruction is coupled through a memory output register 27 unit to the instruction register 28 of the control processing unit. The instruction, of course, defines a step in the processing cycle and may define the operand for an arithematic logic unit 29 which completes the operation on the data in a specified address unit 30, which may be stored in a register or in memory unit 25. The execution, of course, occurs upon an appropriate clock signal. As the microprocessor may be any available unit no further description of the system is given other than as necessary to fully describe the present invention.

Generally, the microprocessor 19 is programmed by suitable software programming techniques to control the movement of the head 12 based on the position signal of the incremental encoder 17. The memory unit 25 includes the usual initializing and start program 26 which is preferably stored in read-only-memory (ROM). The program, of course, provides for reading of the machine inputs and particularly the program selection unit 20. The memory unit 25 further includes a machine data section 31 in which the limitation of a give winding machine is stored. This section is also preferably an ROM memory. The stored data would include for example, the available winding bed length, available filament bandwidths, winding angles and the like. This data will insure that the machine is not erroneously programmed for an impossible winding configuration. The memory unit 25 further includes a series of addresses or a section 33 of a non-volatile memory such as MNOS in which available winding program descriptor tables of the different program definition are stored. Each individual table may consist of one or more subroutines depending upon the particular winding configuration, as more fully developed hereinafter. Each table, however, provides the basic logical machine sequence for generating a particular configuration with the variables given by the programming of the machine by the user. The machine programming may be created using a conventional teletype peripheral unit, not shown, to converse with the microprocessor employing conventional filament winding terminology to identify the several variables necessary to fully define a winding sequence for any given wound article. The microprocessor 19 through its internal programming converts the responses to computer language. The defined winding program is placed in a random access memory (RAM) section 32 of the memory unit 25, which is employed in accordance with usual practice to store data which changes frequently such as the variables of particular winding configurations, historical data employed by the ALU unit 29 and the like.

Each descriptor table thus provides a program to carry out a winding sequence based on empirically or mathematically derived winding formula such as employed in designing known winding machines for defining a particular configuration and permits the user by answering a series of questions to directly introduces the necessary variables and thereby develop the program for a desired winding configuration with the variables placed in a random access memory of memory unit. The program is assigned a program number of the selection control. The descriptor tables or programs may, of course be combined to produce complex windings through the provision of linkage program or table in the descriptor memory section. Thus, a descriptor table, and the several programs caused to look for any given members of times to form a desired configuration.

The writing of the descriptor tables and combining of the program is thus accomplished employing usual computer programming technique and no further description thereof is given.

Figure 4:
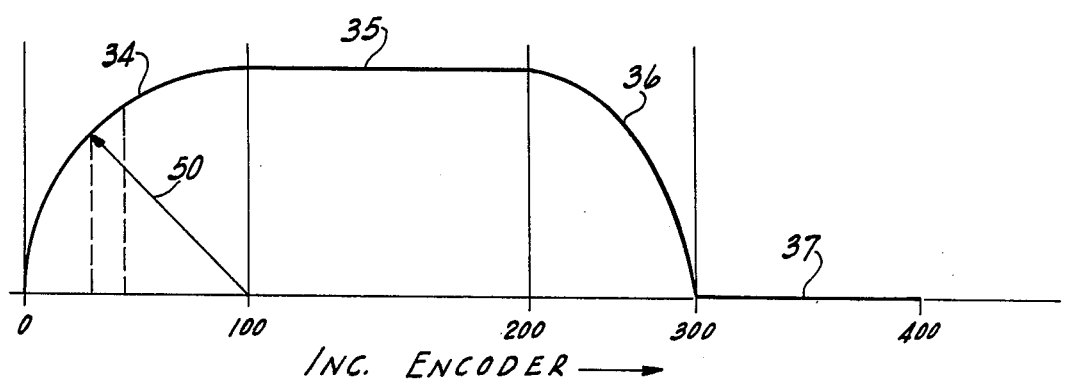
FIG. 4 is graphical illustration of a head speed versus mandrel position for one winding sequence.
Figure 2:
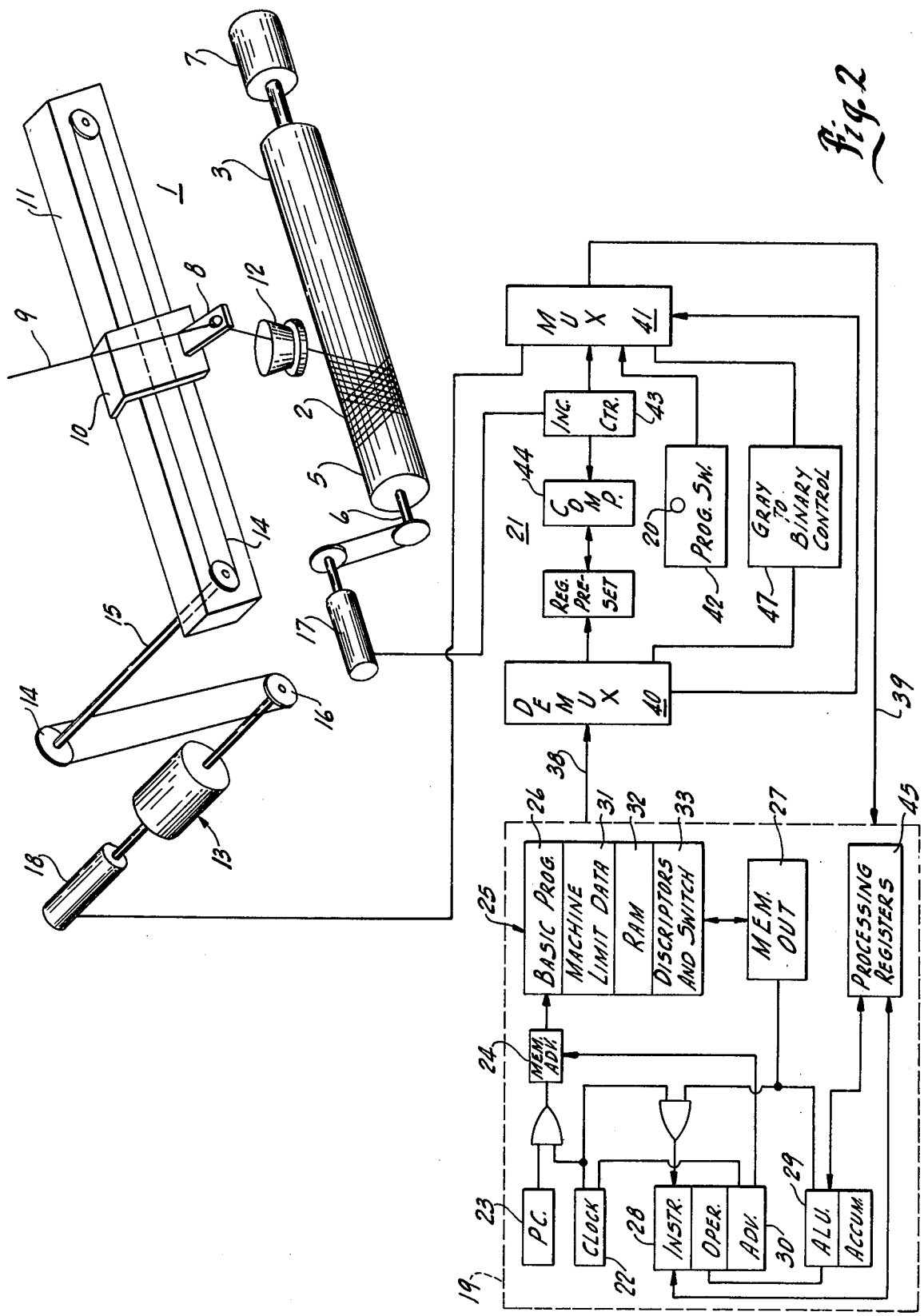
FIG. 2 is a pictorial representation of the drive and control system and of a block diagram of the programmed control system, in accordance with the present invention.

In addition to simple tubular members which employ a constant drive ratio, more complex tubular member such as pressure vessels having formed ends, ribs and the like are often generated with filament winding machines employing complex gear drive systems. The present invention provides for programmed winding of such complex members by providing calculating programs having appropriate descriptor program tables for each portion of the basic cycle. For example, the basic position pattern of the carriage for a pressure vessel may typically be shown in FIG. 4, wherein the incremental encoder readings controls a change in the desired speed pattern between an initial acceleration period 34, a constant speed period 35, a decelerating period 36 and a dwell period 37. The acceleration and deceleration periods 34 and 36 define a number which identifies a cosine value which is selected from a cosine look-up table in memory unit 25. This provides a rapid selection of on appropriate variable for rapid computation of the programmed motor signal for producing the desired acceleration.

When the incremental encoder 17 produces a change-over number as readings 100, 200, 300 and 400, the microprocessor 19 automatically jumps to the appropriate program for that section 34–37 as the result of an appropriate instruction in the program then be executed.

The microprocessor 19 is schematically shown with one output port 38 and one input port 39. The input and outputs are connected through the interfaced circuit 21 which includes suitable deplexer 40 and multiplexer 41 in accordance with conventional computer design practice. The program selection control knob 20 actuates an encoding switch means 42 which is connected to an input of the input deplexer 40 for introducing of the corresponding program number into the microprocessor 19.

The microprocessor 19 initial programming, of course, includes the reading of the encoding means 42 and the selection of the identified program for execution from the program memory in RAM 32.

The interface system also includes an incremental encoder counter 43 having an input connected to the incremental encoder 17 for continuously counting of the output pulses of the incremental encoder and generating a binary number output. The output of the counter 43 is simultaneously impressed on a binary number comparator 44 and the multideplexer 40 to the microprocessor 19.

The microprocessor 19 includes the usual processing registers 45 which are, of course employed as temporary storage means during the processing of the data. The incremental encoder output is coupled to the microprocessor 19 through such an internal register 45 and provides the base position number for calculating of a head position number. The ALU unit 29 rapidly calculates such proper position number based on the calculating program being executed forming a part of the sequence program as a result of the use of the appropriate descriptor table for the particular portion of the incremental encoder 17.

Simultaneously, with the transfer of the incremental encoding number, the position output of the absolute encoder is multiplexed to the microprocessor 19. Thus, although the microprocessor 19 does not at the identical instant take both readings, the time distinction, due to the speed of the computing processing, is so insignificant that the process is for all practical purposes a simultaneous reading of both encoders 17 and 18.

The absolute encoder 18 is preferably such as disclosed in the previously identified copending application of W. George Anderson, et al and provides a readout in a gray code number which is stored in memory unit 25 to provide a record of the actual position. The gray code is, of course, converted to a binary number for storage and calculation in the microprocessor 19. In the illustrated embodiment, a hardwired gray code to binary number converter 47 is connected between the multiplexing devices 40 and 41 for rapid microprocessor controlled conversion of such gray code numbers.

The incremental encoder 17 and the absolute encoder 18 are thus simultaneously read at a fixed sample rate. A sequence of the absolute encoder position readings and the corresponding calculated positions are stored in the RAM memory 25 for calculating the previous and present state of the carriage movements and the operating characteristics of the servomotor 13. Thus, a change in distance between the actual position and the desired position between successive samples gives a speed signal and the rate at which the distance is decreasing or increasing gives an acceleration signal. Thus, the change in speed between the successive samples gives the acceleration of the motor the distances, speed and acceleration provide all data necessary to calculate the desired changes in the energy of the carriage motor 13. If the distance is relatively large, a relatively high acceleration rate will generally be desired. If the distance is small, and the motor acceleration is excessive, the carriage and head would tend to overshoot and the acceleration should therefore be minimized or reversed. The particular formula for maintaining the head position may be provided in accordance with any desired servo drive type system. Generally, in the present embodiment the energizing signal was related to the distance between the actual and desired positions and twice the change in succeeding sample distances.

More particularly, the output signal of the microprocessor is a digital signal which is converted by a digital-to-analog converter (D/A) to an analog signal suitable for energizing of the servomotor 13. The basic speed formulation or signal may conveniently be in terms of the number of absolute units per sample where the sample rate is, of course, constant. The difference in immediately succeeding readings gives the number of absolute encoder units during the preceeding sample period and therefore the speed of positions as well as giving the precise position of the head at the time of the two readings. The difference in two succeeding readings, of course, gives the rate at which the head is changing any error in position. If no difference exists, the head is, of course, moving at a constant rate. The computer thus continuously samples and calculates the actual and desired positions to generate a digital signal in terms of absolute units per sample. The D/A convertor then establishes the corresponding analog signal to either accelerate, decelerate or hold the motor speed constant in accordance with any error in position and the desired motion characteristic set forth by the programmed formulation of the motion.

For example, the calculated and actual readings of the absolute encoder may be tabulated for series of samples:

| Actual | Calculated | Difference | Diff. |
|--------|------------|------------|-------|
| 1005   | 1020       | 15         |       |
|        |            |            | 3     |
| 1012   | 1024       | 12         |       |
|        |            |            | 7     |
| 1021   | 1026       | 5          |       |
|        |            |            | 3     |
| 1028   | 1030       | 2          |       |

The actual and calculated position numbers are readily stored in appropriately assigned memory such as a portion of the RAM memory and continuously updated with each sample to provide a continuously base for calculation of speed and acceleration by the micrporocessor 19 employing any desired programmed calculation which is provided in accordance with conventional programming techniques. In summary, the present invention is based on the unique approach of providing a base movement reading from which a desired position is calculated in accordance with a mathematical or logical definition of the motion and such calculated value is then compared with an actual position value. The history of the motion is also preferably stored and employed in creating the actual controlling signal to permit the rapid and accurate positioning of the winding apparatus even though relatively massive and heavy devices are being moved.

Figure 3:
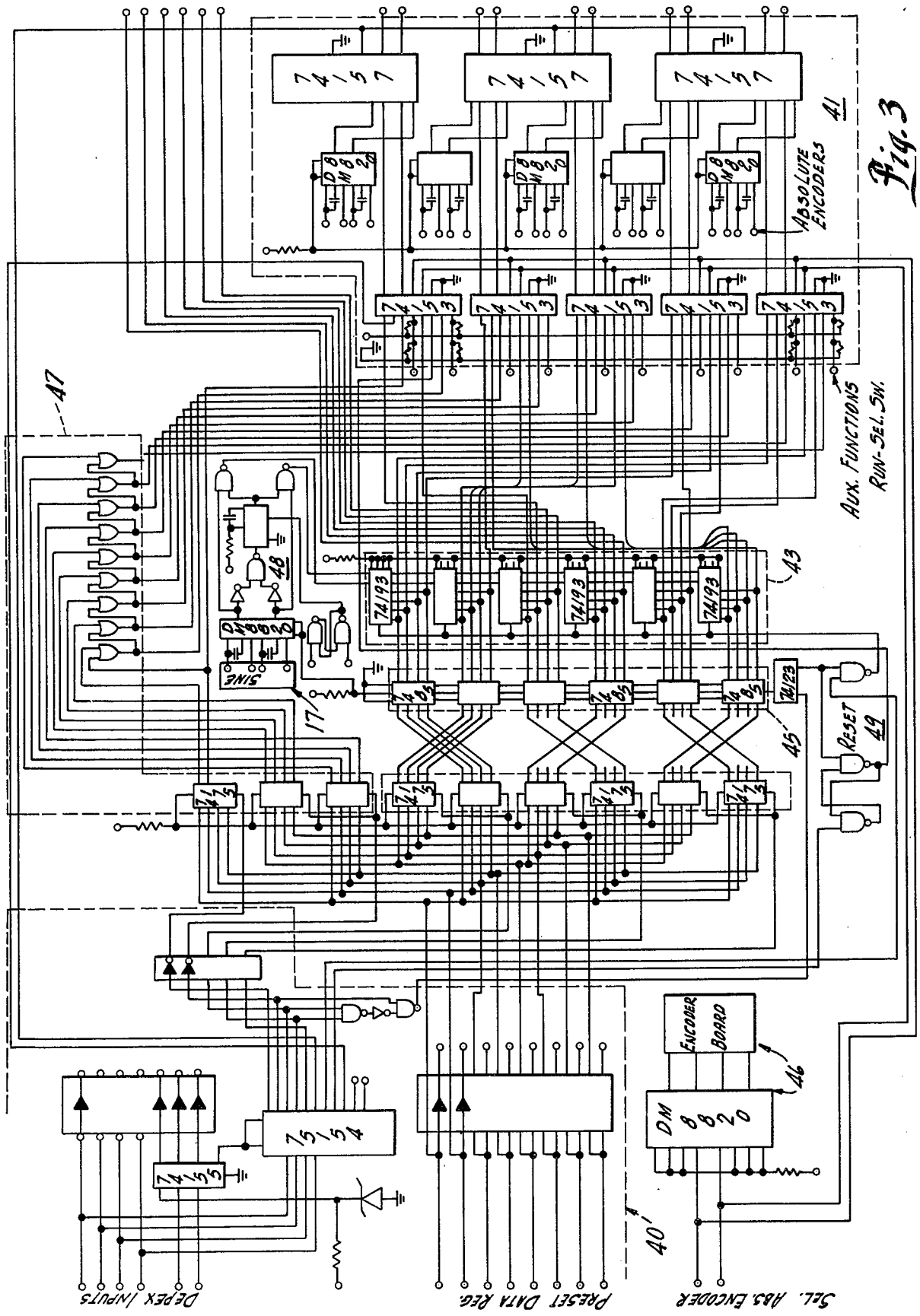
FIG. 3 is a schematic circuit of the interface circuitry shown in FIG. 2.

A more detailed logic illustration of the system for interface systems is shown in FIG. 3 in which readily available circuit chips are identified by the usual identifying members, and showing the various data input and output lines. Diode resistor and logic connecting elements are shown for certain connections, with the understanding that similar connections are, of course, provided for the other input-output lines of such blocks and other similar elements. In FIG. 3, an absolute encoder multiplex unit 46 is shown where the system is employed with several motion controls for selective reading of the several absolute encoders, each as shown in FIG. 1, and providing control thereof in accordance with the illustration of encoders. The incremental encoder input 17 is shown connected by a pulse shaping circuit 48 to the incremental counter 43 and providing for the desired programmed control of the movement. A system reset logic unit 49 is also shown for resetting of the system components. A detailed description is not given as the component function and connections as the connection to the processor will be readily understood and followed by those skilled in the art. The identifying members are the standardized code members for TTL integrated circuits which are available from various manufacturers by such members. Such circuits, for example, are found in the standard reference, Signetics Detail Data Book for 1976. For example, a simple winding apparatus program for winding of pipe section is attached as Table 1. The attached program is typical of that which can be applied and which by appropriate additions can be provided to form more complex shapes and configurations. Further, certain standard routines which can be directly obtained from the equipment manufacturer are not set forth for purposes of simplicity and because these can be directly and readily provided. For example, floating point numbers are employed and the routine therefore is not included. As the microprocessor may be any suitable conventional computing device and the programming is provided in accordance with known techniques to implement the basic concepts of the present invention, no further detail thereof is given herein or deemed necessary to the full understanding and implementation of this invention based upon available apparatus.

The microprocessor readily computes the speed and acceleration characteristic based on the previous sequence of changes in the difference between the actual and desired positions and based thereon generates a motor energizing control signal to the servomotor. Although a detailed description is given for the single longitudinal axis of head motion, the head 8, as previously discussed, is also mounted for other degrees of motion, such as vertical, radial or like motion. Generally, an additional and separate positioning servomotor is provided. In accordance with the present invention, a separate absolute encoder means would be similarly provided and the position reading and motor control multiplexed into the microprocessor for similarly controlling of such additional motion. For simplicity of wiring, for example, the several different absolute encoders can be multiplexed and placed into the microprocessor 19 for the appropriate calculations and development of the control for each separate motion. Once again, the processing capability of the system is, of course, such that the several controls provide an essentially instantaneous continuous motion control. The programming is again based on conventional techniques and can be readily provided. Typical sets of programs may include the following which employ the known assembly language for the Intel 8080 microprocessor, manufactured and sold by the Intel Corporation of Santa Clara, California.

The programs include a supervisor program (Supr) which forms the base for the computer operation and includes an idle routine for continous checking of the run and reset buttons as well as the pipe winding selection keyboard, attached as Table I. The supervisor program thus acts as a monitor to transfer control or set up information and thereby overall system operations. The program includes a keyboard routine to read the keyboard for program identification and to transfer control to such program, if valid. Thus, the idle routine permits transfer to a pipe program (Pipe), such as shown in attached Table II, for creation of the appropriate description tables for various desired winding configurations and subsequent use of such tables in producing the selected winding configurations. A "Reset" driver routine for the reset button is provided and, when executed, positions the carriage in an initial start position at the headstock. A "Run" driver routine for the Run button loads a selected winding description table or tables and transfers control to a Runone routine, such as shown in the Runone program (Runone) attached as Table III.

The pipe program, as shown in Table II, accepts as input all the necessary parameters to define a pipe to be wound. Such information would include the known parameters such as headstock position of carriage, length of pipe, winding angle and such other information as used in defining a pipe. From this information the program, through the mathematical or empirically derived formulas employed in defining a pipe configuration calculates and displays the amount of dwell, the number of circuits or passes per filament layer and the corrected or proper bandwidth to achieve no overlap. The pipe program then generates the proper winding descriptor table for the specified configuration which is used by the runone program routine. The specified table has an assigned number on the selection control. The computer, of course, needs this table to define the selective winding.

When a pipe is to be formed, the operator selects the configuration and executes the Run control button. The driver routine loads the appropriate descriptor table or tables into the computer and transfers control to the Runone program. The Runone program interprets the information contained in a winding descriptor table and initiates and controls the appropriate machine operation. The program includes most of the run time programs and includes the following primary functions: read incremental encoder, read absolute encoders, and keep track of the real time clock so that smaple time uniformity is maintained. The program also employs a special carriage Feed Routine program (Carda), such as shown in Table IV. This latter program accepts as input the calculated position of the carriage based on the incremental encoder reading and the actual position of the carriage as read from the absolute encoders. An output is generated which consists of a binary number to the D/A converter which corresponds to the voltage needed to maintain or correct the position of the carriage. The number or value is created in two stages. First, the speed at which the carriage should be moving if error is disregarded is determined. The programmed computer stores the previous calculated position of the carriage and by subtracting therefrom the current calculated carriage position, the change in position per sample; i.e. the speed is produced. This difference is multiplied by the scale conversion factor so that the product is the base number, which, after modification, if necessary, is to be fed the Digital to Analog Converter for producing the necessary analog voltage to the servo drive motor. The second stage includes calculation of any error correction which must be added to the base number. To do this, the routine stores the two previous actual positions of the carriage in a similar manner the speed can be calculated and applied to a correction formula: $C = D - X\Delta D$, where C is the correction factor, D is the distance between the calculated and the actual positions of the carriage, $\Delta D$ is the speed at which the actual and calculated positions are converging or diverging, and X is a factor which relates to the damping factor and hardness of control system desired, which of course changes with the particular servo drive used, and may be readily determined empirically or by the drive specification and parameters. Finally, the base number resulting from the first stage and the correction number derived from the second stage are added together to set the output value.

McClean et al    FILAMENT WINDING APPARATUS
APPENDIX
Program For Pipe Winding Apparatus

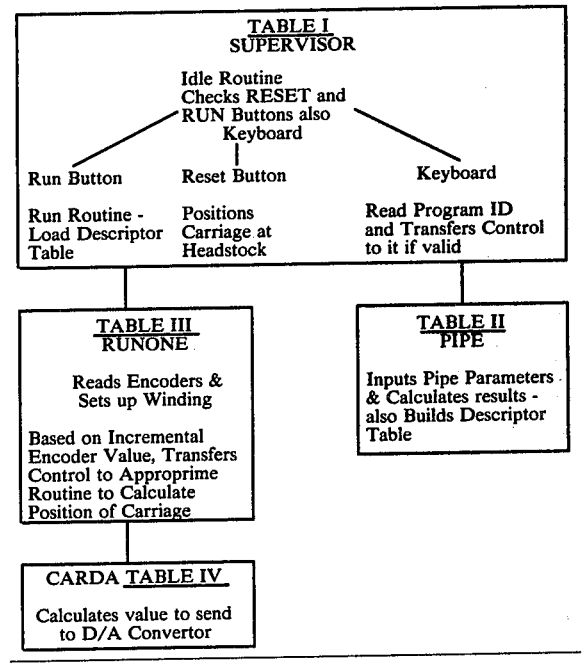

Various modes of carrying out the invention are contemplated as being within the scope of the following claims, particularly pointing out and distinctly claiming the subject matter which is regarded as the invention.

We claim:

1. A filament winding apparatus having a rotating support mandrel and a filament positioning means movable relative to the mandrel from a reference position for controlling the positioning of a filament on the mandrel, comprising first encoder means for producing an output signal corresponding to the rotation of the mandrel, a second encoder means coupled to the filament positioning means for producing an output signal corresponding to the absolute positioning of the positioning means, a drive means for positioning the filament positioning means and including an input, and a microprocessor means including a programmable memory for storing at least one program describing the motion of the filament positioning means in terms of the rotation of the mandrel and utilizing the input data from the first and second encoder means to calculate the proper motion of the filament positioning means, and means to generate a signal to the drive means in accordance with the calculated position and the output of the absolute encoder.

2. In the filament winding machine of claim 1 wherein said first encoder means is an incremental encoder coupled to the mandrel.

3. The filament winding apparatus of claim 1 wherein said second encoder means is sampled at a constant rate and produces a binary number corresponding to the absolute position of the positioning means, said microprocessor means storing a plurality of successive immediately preceding readings for determining the speed and acceleration of the drive means and generating a control signal for controlling the speed and acceleration of the drive means.

4. In the filament winding apparatus of claim 1 wherein said positioning means is sequentially moved in distinct separate drive modes including a constant speed mode, an accelerating mode, a decelerating mode and a dwell mode, said accelerating and decelerating modes including tables in said memory defining a speed modifying signal for controlling the energizing signal to establish a predetermined position in accordance with the calculated stored program and a drive signal in accordance with the drive mode.

5. The filament winding apparatus of claim 4 wherein said second encoder means is sampled at a constant rate and produces a binary number corresponding to the absolute position of the positioning means, said microprocessor means storing a plurality of successive immediately preceding readings for determining the speed and acceleration of the drive means and generating a control signal for controlling the speed and acceleration of the drive means and means responsive to the output of the second encoder means to establish the drive mode.

6. A filament winding apparatus having a rotating support mandrel and a filament positioning means reciprocable along the mandrel from a reference position, comprising first encoder means for producing an output signal corresponding to the rotation of the mandrel, a second encoder means coupled to the filament positioning means for producing an output signal corresponding to the absolute positioning, a microprocessor having a calculating means generating a position related signal for each position sample and having an output, a drive means for positioning the filament positioning means and including an input coupled to said drive means, and said microprocessor including a means for sampling said first and second encoder means and inputting of said encoder means to said microprocessor and having memory means storing both data which describes the motion the positioning means is to make and a program which utilizes the stored data and the input data from the encoder means to calculate proper motion of the machine, said calculating means including means defining a particular position for each incremental sample, means comparing the calculated position number with the actual position sample number, said calculating means generating a drive signal based on the historical sequence of said samples to establish a controlled acceleration of the drive means.

7. In the filament winding apparatus of claim 6 wherein said first encoder means is a digital incremental encoder and said second encoder means is an absolute digital encoder coupled to the filament positioning means.

8. In the filament winding apparatus of claim 7 including speed modifying tables including a modifying number for each position within a total predetermined number of the incremental encoder numbers, said calculating means employing said numbers in generating said drive signal.

9. The filament winding apparatus of claim 8 wherein said table is a sine-cosine table defining a speed modifying characteristic for the motion of said positioning means.

10. The filament winding apparatus of claim 6 wherein said filament positioning means moves in sequence of predetermined mathematical defined motions, said memory means storing a plurality of distinct programs one for each of such motions, and means connected to said microprocessor and to said first encoder means and responsive to the output signal corresponding to the changeover position invoking the program which describes the motion for the followng sequence calculates the proper motion of the filament positioning means.

11. In the filament winding apparatus of claim 6 wherein said microprocessor includes a series of program tables defining different winding configurations for developing particular winding programs by inserting of identifying variables and defining a particular winding configuration.

12. In the filament winding apparatus of claim 11 wherein a linkage table provides for combining of the program tables to form the particular winding program.

13. The filament winding apparatus of claim 6 wherein said filament positioning means includes means for gathering a plurality of individual filaments into a band for winding on the mandrel from said reference position.

14. In the filament winding apparatus of claim 6 said microprocessor includes a plurality of different winding programs, said first encoder means is an incremental digital encoder, a resettable digital counter coupled to said incremental encoder means to count the pulse output, a digital comparator having a first input connected to said counter and a second input connected to said microprocessor for receiving a reference position number, said comparator having an output connected to said microprocessor for signalling the microprocessor to jump to a new winding program.

15. A filament winding apparatus for producing a filament would object having a rotating support mandrel and a multiple filament head mounted on a track for reciprocable movement along the mandrel from a reference position, comprising a first digital encoder means for producing a train of output signal pulses corresponding to the rotation of the mandrel, a second digital encoder means coupled to the filament head for producing an output number identifying the absolute positioning from said reference position a drive means for positioning the head, and a microprocessor means including a calculating means and a memory having a plurality of individual programs defining different mathematically defined motion of the filament head in accordance with the rotation of the mandrel for producing different winding configurations and each having unspecified variables permitting definition of a particular winding configuration including a head position for each incremental encoder sample and a velocity motion signal for each head position for each of said winding configurations said microprocessor having means to combine said programs into a particular sequence program defining a plurality of winding segments for the wound object, means responsive to said second digital encoder means to selectively execute said particular programs and utilizing the outputs of said encoders to calculate the proper position of the head and a drive signal based on the calculated proper position and the actual head position.

16. In the filament winding machine of claim 15 wherein a plurality of said particular programs are stored in memory and said apparatus includes a selection means for selection of any one of said particular programs and said second encoder means is an absolute encoder coupled to the filament head.

* * * * *

UNITED STATES PATENT AND TRADEMARK OFFICE
CERTIFICATE OF CORRECTION

PATENT NO. : 4,145,740  Page 1 of 4

DATED : March 20, 1979

INVENTOR(S) : William G. McClean and Daniel C. Budge

It is certified that error appears in the above-identified patent and that said Letters Patent are hereby corrected as shown below:

Column 1, Line 11, beginning of the line, cancel "conventionally" and insert --- conveniently ---;

Column 2, Line 14, after "complete" cancel "basis" and insert --- basic ---;

Column 2, Line 48, before "tables" cancel "discriptor" and insert --- descriptor ---;

Column 2, Line 53, after "The" cancel "discriptor" and insert --- descriptor ---;

Column 3, Line 21, after "pairs" cancel "provided" and insert --- provides ---;

Column 4, Line 27, beginning of the line, cancel "witdh" and insert --- width ---;

Column 4, Line 29, after "is" cancel "moveably" and insert --- movably ---;

UNITED STATES PATENT AND TRADEMARK OFFICE
CERTIFICATE OF CORRECTION

PATENT NO. : 4,145,740
DATED : March 20, 1979
INVENTOR(S) : William G. McClean and Daniel C. Budge It is certified that error appears in the above-identified patent and that said Letters Patent are hereby corrected as shown below:

| Column | 5, | Line | 44, | end of line, after "address" cancel "registor" and insert --- register ---; |
| Column | 6, | Line | 1, | beginning of the line, cancel "give" and insert --- given ---; |
| Column | 6, | Line | 10, | after "program" cancel "definition" and insert --- definitions ---; |
| Column | 6, | Line | 36, | after "directly" cancel "introduces" and insert --- introduce ---; |
| Column | 6, | Line | 52, | after "tubular" cancel "member" and insert --- members ---; |
| Column | 7, | Line | 1, | after "of" cancel "on" and insert --- an ---; |
| Column | 7, | Line | 8, | after "then" cancel "be" and insert --- being ---; |

UNITED STATES PATENT AND TRADEMARK OFFICE
CERTIFICATE OF CORRECTION

PATENT NO. : 4,145,740

DATED : March 20, 1979

INVENTOR(S) : William G. McClean and Daniel C. Budge

It is certified that error appears in the above-identified patent and that said Letters Patent are hereby corrected as shown below:

| | | | | |
|---|---|---|---|---|
| Column | 8, | Line | 1, | after "operating" cancel "characteristics" and insert --- characteristic ---; |
| Column | 8, | Line | 60, | before "base" cancel "continuously" and insert --- continuous ---; |
| Column | 8, | Line | 61, | end of line, after "the" cancel "micr-" and insert --- micro- ---; |
| Column | 8, | Line | 62, | beginning of the line, cancel "porocessor" and insert --- processor ---; |
| Column | 10, | Line | 13, | after "for" cancel "continous" and insert --- continuous ---; |
| Column | 10, | Line | 45, | after "the" cancel "runone" and insert --- Runone ---; |
| Column | 10, | Line | 59, | after "that" cancel "smaple" and insert --- sample ---; |

UNITED STATES PATENT AND TRADEMARK OFFICE
CERTIFICATE OF CORRECTION

PATENT NO. : 4,145,740

DATED : March 20, 1979

INVENTOR(S) : William G. McClean and Daniel C. Budge

It is certified that error appears in the above-identified patent and that said Letters Patent are hereby corrected as shown below:

| | | | |
|---|---|---|---|
| Column 11, | Line 3, | | after "disregarded" cancel "is" and insert --- as ---; |
| Column 14, CLAIM 15 | Line 21, | | after "position" insert a comma --- , ---; |
| Column 14, CLAIM 15 | Line 23, | | after "having a" cancel "pluraity" and insert --- plurality ---; |

Signed and Sealed this

Second Day of October 1979

[SEAL]

Attest:

RUTH C. MASON
Attesting Officer

LUTRELLE F. PARKER
Acting Commissioner of Patents and Trademarks